(12) United States Patent
Zhu et al.

(10) Patent No.: US 9,118,463 B2
(45) Date of Patent: Aug. 25, 2015

(54) DISTRIBUTED SINGLE SIGN ON TECHNOLOGIES INCLUDING PRIVACY PROTECTION AND PROACTIVE UPDATING

(75) Inventors: Bin Benjamin Zhu, Edina, MN (US); Min Feng, Sichuan (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 649 days.

(21) Appl. No.: 13/408,434

(22) Filed: Feb. 29, 2012

(65) Prior Publication Data

US 2012/0174207 A1    Jul. 5, 2012

Related U.S. Application Data

(63) Continuation of application No. 12/276,428, filed on Nov. 24, 2008, now Pat. No. 8,151,333.

(51) Int. Cl.
| | |
|---|---|
| *H04L 9/28* | (2006.01) |
| *H04L 9/00* | (2006.01) |
| *H04K 1/00* | (2006.01) |
| *H04L 9/32* | (2006.01) |
| *G06F 21/00* | (2013.01) |
| *H04L 9/08* | (2006.01) |
| *H04L 29/06* | (2006.01) |

(52) U.S. Cl.
CPC .............. *H04L 9/085* (2013.01); *H04L 9/3218* (2013.01); *H04L 9/3226* (2013.01); *H04L 63/0815* (2013.01); *H04L 63/0435* (2013.01)

(58) Field of Classification Search
CPC .... H04L 63/0815; H04L 9/085; H04L 9/3218

USPC .......................... 709/229; 380/28; 726/2, 8, 9
See application file for complete search history.

(56) References Cited

U.S. PATENT DOCUMENTS

| | | | |
|---|---|---|---|
| 5,241,594 A | 8/1993 | Kung | |
| 5,625,692 A | 4/1997 | Herzberg | |
| 5,684,950 A | 11/1997 | Dare et al. | |

(Continued)

FOREIGN PATENT DOCUMENTS

| | | |
|---|---|---|
| JP | 08-292929 | 11/1996 |
| JP | 09-212089 | 8/1997 |

(Continued)

OTHER PUBLICATIONS

"A Novel Distributed Authentication Framework for Single Sign-On Services." IEEE Xplore. published Nov. 1993. Web. Oct. 30, 2014.*

(Continued)

*Primary Examiner* — Michael Chao
*Assistant Examiner* — Feliciano Mejia
(74) *Attorney, Agent, or Firm* — Dan Choi; Judy Yee; Micky Minhas

(57) ABSTRACT

Technologies for distributed single sign-on operable to provide user access to a plurality of services via authentication to a single entity. The distributed single sign-on technologies provide a set of authentication servers and methods for privacy protection based on splitting secret keys and user profiles into secure shares and periodically updating shares among the authentication servers without affecting the underlying secrets. The correctness of the received partial token or partial profiles can be verified with non-interactive zero-knowledge proofs.

20 Claims, 9 Drawing Sheets

(56) References Cited

U.S. PATENT DOCUMENTS

| | | | |
|---|---|---|---|
| 5,706,349 | A | 1/1998 | Aditham |
| 5,768,388 | A | 6/1998 | Goldwasser |
| 6,421,768 | B1 | 7/2002 | Purpura |
| 6,748,084 | B1 | 6/2004 | Gau et al. |
| 6,816,970 | B2 | 11/2004 | Morgan et al. |
| 7,055,032 | B2 | 5/2006 | Sandhu et al. |
| 7,187,772 | B2 | 3/2007 | Vora et al. ............... 380/277 |
| 7,260,836 | B2 | 8/2007 | Roskind et al. |
| 7,263,191 | B2 | 8/2007 | Chen et al. ............... 380/265 |
| 7,266,199 | B2 | 9/2007 | Yung et al. |
| 7,690,026 | B2 | 3/2010 | Zhu et al. |
| 7,769,998 | B2 | 8/2010 | Lynch et al. ............... 713/155 |
| 8,117,456 | B2 | 2/2012 | Numao et al. |
| 8,437,742 | B2 | 5/2013 | Garskof |
| 8,745,715 | B2 | 6/2014 | Lindholm |
| 2003/0084290 | A1 | 5/2003 | Murty et al. ............... 713/168 |
| 2006/0036857 | A1 | 2/2006 | Hwang |
| 2006/0083228 | A1 | 4/2006 | Ong et al. |
| 2007/0044143 | A1 | 2/2007 | Zhu et al. |
| 2008/0148376 | A1 | 6/2008 | Onozawa et al. ............... 726/8 |
| 2010/0046739 | A1 | 2/2010 | Schneider ............... 380/28 |
| 2010/0054480 | A1 | 3/2010 | Schneider |
| 2010/0077469 | A1 | 3/2010 | Furman et al. ............... 726/8 |
| 2010/0100724 | A1 | 4/2010 | Kaliski, Jr. ............... 713/155 |
| 2011/0126291 | A1 | 5/2011 | Araki |
| 2013/0252583 | A1 | 9/2013 | Brown |

FOREIGN PATENT DOCUMENTS

| | | |
|---|---|---|
| JP | 10-143591 | 5/1998 |
| JP | 11-282982 | 10/1999 |
| JP | 2003-099403 | 4/2003 |
| JP | 2004-220325 | 8/2004 |
| JP | 2004-334330 | 11/2004 |
| JP | 2005-167412 | 6/2005 |
| KR | 20020095815 | 12/2002 |
| KR | 20040097505 | 11/2004 |
| RU | 2 178 913 C1 | 1/2002 |
| RU | 2 225 679 C2 | 3/2004 |
| WO | WO 00/67415 A2 | 11/2000 |
| WO | WO 01/72009 A2 | 9/2001 |

OTHER PUBLICATIONS

"Increasing Availability and Security of an Authentication Service." IEEE Xplore. Published Jun. 5, 1993. Viewed Web. Oct. 30, 2014.*
U.S. Appl. No. 12/276,428, filed Nov. 24, 2008, Bin Benjmain Zhu.
U.S. Appl. No. 13/371,427, filed Feb. 11, 2011, Bin Benjamin Zhu.
U.S. Appl. No. 13/408,875, filed Feb. 29, 2012, Bin Benjamin Zhu.
U.S. Appl. No. 13/409,087, filed Feb. 29, 2012, Bin Benjamin Zhu.
U.S. Appl. No. 11/208,509, filed Aug. 22, 2005, Bin Zhu.
CA Office Action for Application No. 2,619,420, Sep. 26, 2013.
JP Notice of Rejection for Application No. 2008-527997, Dec. 22, 2011.
KR Notice of Preliminary Rejection for Application No. 10-2008-7004375, Nov. 29, 2012.
Singapore Written Opinion from the Danish Patent and Trademark Office, for Application No. 200800944-1, mailed on Mar. 4, 2009, 9 pgs.
PCT International Search Report and Written Opinion, for Application No. PCT/US2006/032166, Jan. 30, 2007, pp. 1-10.
Blakley, "Safeguarding cryptographic keys", In Proceedings of the National Computer Conference 1979, vol. 48, pp. 313-317, 1979.
Pedersen, "Non-Interactive and Information-Theorectic Secure Verifiable Secret Sharing", In Proc. Crypto'91, vol. LNCS 576, pp. 129-140, 1991.
Stadler, "Publicly Verifiable Secret Sharing", In Advances in Cryptology—EUROCRYPT'96, vol. LNCS 1070, pp. 190-199, 1996.
Chinese First Office Action, for Patent Application No. 200680030296.5, Apr. 24, 2009.

Shiuh-Jeng Wang et al.; , "Dynamic Threshold Multi-secret Sharing Scheme using Elliptic Curve and Bilinear Maps," FGCN '08, Second International Conference on, vol. 2, No., pp. 405-410, Dec. 13-15, 2008; doi: 10.1109/FGCN.2008.171 URL: http://ieeexplore.ieee.org/stamp/stamp.jsp?tp=&arnumber=4734246&isnumber=4734155.
Ibrahim, M.H. et al., "A robust threshold elliptic curve digital signature providing a new verifiable secret sharing scheme," Circuits and Systems, 2003 IEEE, Symposium vol. 1, No., pp. 276-280 vol. 1, 30-30 Dec. 2003; doi: 10.1109/MWSCAS.2003.1562272 URL: http://ieeexplore.ieee.org/stamp/stamp.jsp?tp=&arnumber=1562272&isnumber=33166.
Hillenbrand, et al., "A Single Sign-On Framework for Web-Services-based Distributed Applications", Retrieved at <<http://dspace.icsy.de:12000/dspace/bitstream/123456789/153/1/DPArchiv.0134.pdf>>, pp. 7, Jun. 15-17, 2005.
Powell, et al., "OpenID: Decentralised Single Sign-on for the Web", Retrieved at <<http://www.ariadne.ac.uk/issue51/powell-record-on/>>, Oct. 6, 2005, pp. 11.
Cachin, et al., "Asynchronous Verifiable Secret Sharing and Proactive Cryptosystems", Retrieved at <<http://www.zurich.ibm.com/~cca/papers/ap.pdf>>, Proceedings 9th ACM Conference on Computer and Communications Security (CCS-9), Washington, DC, USA, Aug. 29, 2002, pp. 1-25.
Basney, et al., "Credential Wallets: A Classification of Credential Repositories Highlighting MyProxy", Retrieved at <<http://www.ncsa.uiuc.edu/~jbasney/credentialwalletTPRC.pdf>>, pp. 1-20, Sep. 2003.
"Simplify Your Sign In", Retrieved at <<http://www.passport.com>>, Oct. 6, 2008, p. 1.
"Browser-Based Authentication", Retrieved at <<http://developer.yahoo.com/auth/>>, Oct. 6, 2008, pp. 2.
Cohen, Gabe, "The Liberty Alliance", Retrieved at <<http://www.projectliberty.org>>, Feb. 13, 2008, p. 1.
"SAML Single Sign-On (SSO) Service for Google Apps", Retrieved at <<http://code.google.com/apis/apps/sso/saml_reference_implementation.html>>, Oct. 6, 2008, pp. 4.
Chaum, et al., "Transferred Cash Grows in Size", Retrieved at <<http://dsns.csie.nctu.edu.tw/research/crypto/HTML/PDF/E92/390.PDF>>, pp. 390-407, 1992.
Chen, et al., "ThresPassport—A Distributed Single Sign-On Service", Retrieved at <<http://www.springerlink.com/content/b8fk5vq04u6cve1y/fulltext.pdf>>, ICIC 2008, Part II, LNCS 3645, 2005, pp. 771-780.
Chor, et al., "Verifiable Secret Sharing and Achieving Simultaneity in the Presence of Faults", Retrieved at <<http://ieeexplore.ieee.org/xpl/freeabs_all.jsp?isnumber=4568116&arnumber=4568164&count=66&index=47>>, pp. 383-395, 1985.
Feldman, Paul, "A Practical Scheme for Non-Interactive Verifiable Secret Sharing", Retrieved at <<http://ieeexplore.ieee.org/stamp/stamp.jsp?arnumber=4568297&isnumber=4568245>>, pp. 427-437, 1987.
Kohl, et al., "The Kerberos Network Authentication Service (v5)", Retrieved at <<http://delivery.acm.org/10.1145/rfc_fulltext/RFC1510/rfc1510.txt?key1=RFC1510&key2=7747823221&coll=GUIDE&dl=GUIDE&CFID=5282338&CFTOKEN=46555189>>, Sep. 1993, pp. 1-105.
Herzberg, et al., "Proactive Secret Sharing or: How to Cope with Perpetual Leakage", Retrieved at <<http://citeseerx.ist.psu.edu/viewdoc/download?doi=10.1.1.44.6359&rep=rep1&type=pdf>>, Nov. 1, 1995, pp. 1-22.
Josephson, et al., "Peer-to-Peer Authentication with a Distributed Single Sign-On Service", Retrieved at <<http://iptps04.cs.ucsd.edu/papers/josephson-sign-on-pdf>>, pp. 1-6, 2004.
Kormann, et al., "Risks of the Passport Single Signon Protocol", Retrieved at <<http://www.cs.jhu.edu/~rubin/courses/sp03/papers/passport.pdf>>, Appeared in IEEE Computer Networks, Jul. 2000, pp. 12.
"Introduction to Windows Live ID", Retrieved at <<http://msdn.microsoft.com/en-us/library/bb288408.aspx>>, Apr. 2006, pp. 5.
Menezes, et al., "Lamport, Handbook of Applied Cryptography", Retrieved at <<http://www.cacr.math.uwaterloo.ca/hac/about/chap1.pdf>>, CRC Press, 1996, pp. 49.

(56) References Cited

OTHER PUBLICATIONS

Oppliger, Rolf, "Microsoft Net Passport: A Security Analysis", Retrieved at <<http://ieeexplore.ieee.org/xpl/freeabs_all.jsp?arnumber=1212687>>, IEEE Computer Society, Jul. 2003, pp. 29-35.

Pashalidis, et al., "Taxonomy of Single Sign-On Systems", Retrieved at <<http://www.isg.rhul.ac.uk/cjm/atosso.pdf>>, pp. 16, 2003.

Perl, et al., "Data Management for Internet-Scale Single-Sign-On", Retrieved at <<http://www.usenix.org/event/worlds06/tech/prelim_papers/perl/perl_html/>>, Oct. 6, 2008, pp. 8.

Schoenmakers, Berry, "A Simple Publicly Verifiable Secret Sharing Scheme and its Application to Electronic Voting", Retrieved at <<http://portal.acm.org/citation.cfm?id=646764.703956>>, CRYPTO 1999, vol. 1666 of Lecture Notes in Computer Science, Springer-Verlag, 1999, pp. 148-164.

Shamir, Adi, "How to Share a Secret", Retrieved at <<http://www.caip.rutgers.edu/~virajb/readinglist/shamirtering.pdf>>, Communications of the ACM, Nov. 1979, vol. 22, No. 11, pp. 612-613.

Shoup, Victor, "Practical Threshold Signatures", Retrieved at <<http://www.iacr.org/archive/eurocrypt2000/1807/18070209-new.pdf>>, pp. 209-222, 2000.

"Secret sharing", Wikipedia, the free encyclopedia, Jun. 5, 2008.

Wang, "A Multiple Secret Sharing Scheme based on Matrix Projection", 2009 33rd Annual IEEE International Computer Software and Applications Conference, COMPSAC, Jul. 20-24, 2009.

Pang, "A Verifiable (t, n) Multiple Secret Sharing Scheme and Its Analyses", International Symposium on Electronic Commerce and Security, ISECS, Aug. 3-5, 2008.

US 5,373,559, 12/1994, Kaufman (withdrawn)

\* cited by examiner

FIG. 3

310 — S: Generates a secret key $K_S$, $1 < K_S < q - 1$.

320 — S: Picks up a polynomial $f(x)$ of order $t-1$ with random coefficients $\{a_i \in Z_q\}$ except the constant which is set to $K_S$:

$$f(x) = K_S + a_1 x + \cdots + a_{t-1} x^{t-1} \mod q.$$

Calculates $K_S^i = f(x_i)$ for a set of $n$ distinctive values $\{x_i \in Z_q \setminus \{0\}\}$, $1 \leq i \leq n$. Each $x_i$ is a unique public number associated with the $i$-th authentication server $A_i$.

330 — $S \to A_i, 1 \leq i \leq n$: $SID$, $K_S^i$, [$S$ broadcasts $g^{a_1}, \ldots, g^{a_{t-1}}, g^{K_S}$].

340 — $A_i, 1 \leq i \leq n \to S$: [If $K_S^i$'s verification passes,] $A_i$ stores $SID$, $K_S^i$ [and $g^{a_1}, \ldots, g^{a_{t-1}}, g^{K_S}$] for later use, and acknowledges with "Success".

300

410 — $U$: Picks a secret number $r_U$, $1 < r_U < q-1$, and calculate $r_U^{-1}$ mod $q$.

420 — $U$: Picks up a polynomial $w(x)$ of order $t-1$ with random coefficients $\{b_i \in Z_q\}$ except the constant which is set to $r_U$:
$$w(x) = r_U + b_1 x + \cdots + b_{t-1} x^{t-1} \mod q.$$
Suppose that the profile content is one-to-one mapped to a member $P_f$ of the subgroup $G_q$. $P_f \in G_q$. $U$ calculates $P_{f,\Gamma} = (P_f)^{r_U^{-1}}$, and $P_U^i = w(x_i)$.

430 — $U \to A_i$, $1 \le i \le n$: $UID$, $P_U^i$, and $P_{f,\Gamma}$. [$U$ broadcasts $g^{b_1}, \ldots, g^{b_{t-1}}, g^{r_U}$].

440 — $A_i$, $1 \le i \le n \to U$: [If $P_U^i$ verification passes,] $A_i$ calculates $P_{f,\Gamma}^i = P_{f,\Gamma}^{k_U^i}$, stores $UID$, $P_{f,\Gamma}$, and $P_{f,\Gamma}^i$ [and $g^{b_1}, \ldots, g^{b_{t-1}}, g^{r_U}$] for later use, and acknowledges with "Success".

610 — $U \to S$: Request access to a service.

620 — $S \to U$: $SID, ns, [g^{rs}]$, [a list of $t$ authentication servers $\{A_{d_j}; 1 \le j \le t\}$].

630 — $U$: [Calculates $g^{rv}$, and] for $1 \le j \le t$, does

640 — (a) $U \to A_{d_j}$: $UID, SID, ns, [g^{rs}, g^{rv}]$

650 — (b) $A_{d_j} \to U$: $T_{d_j} = h^{K_S^{d_j}}, [g^{a_1}, \ldots, g^{a_{t-1}}, g^{K_S^{d_j}}], DLEQ(g, g^{K_S^{d_j}}, h, T_{d_j})]$, where $h = \mathcal{H}_1(UID, SID, ns, [g^{rs}, g^{rv}])$.

660 — $U \to S$: $UID, h^{K_S} = \mathcal{R}(T_{d_j}, 1 \le j \le t), [g^{rv}]$.

670 — $S \to U$: access is granted or denied.

710 — $U \to S$: Request access to a service.

720 — $S \to U$: $SID, n_S, [g^{rs}]$, [a list of $t$ authentication servers $\{A_{d_j}, 1 \leq j \leq t\}$].

730 — $U$: [Calculates $g^{rv}$, and] For $1 \leq j \leq t$, does

740 — (a) $U \to A_{d_j}$: $UID, SID, n_S, [g^{rs}, g^{rv}]$

750 — (b) $A_{d_j} \to U$: $T_{d_j} = h^{K_S^{a_j}}, T'_{\beta_j} = h'^{K_S^{a_j}} P_{f,\Gamma}^{P_{v,\Gamma}^{a_j}}$,
$[g^{a_1}, \ldots, g^{a_{t-1}}, g^{K_S}, DLEQ(g, g^{K_S^{a_j}}, h, T_{d_j}), P_{f,\Gamma},$
$g^{b_1}, \ldots, g^{b_{t-1}}, g^{rv}, DLEQ2(g, g^{K_S^{a_j}}, g, g^{P_{v,\Gamma}^{a_j}}, h', h^{P_{f,\Gamma}} P_{v,\Gamma}^{a_j}, T'_{d_j})]$, where $h = \mathcal{H}_1(UID, SID, n_S, [g^{rs}, g^{rv}])$,
and $h' = \mathcal{H}_3(UID, SID, n_S, [g^{rs}, g^{rv}])$.

760 — $U \to S$: $UID, h^{K_S}, \mathcal{R}(T_{d_j}, 1 \leq j \leq t), h'^{K_S} P_f = \mathcal{R}(T'_{d_j}, 1 \leq j \leq t), [g^{rv}]$ 770 — $S \to U$: access is granted or denied.

700

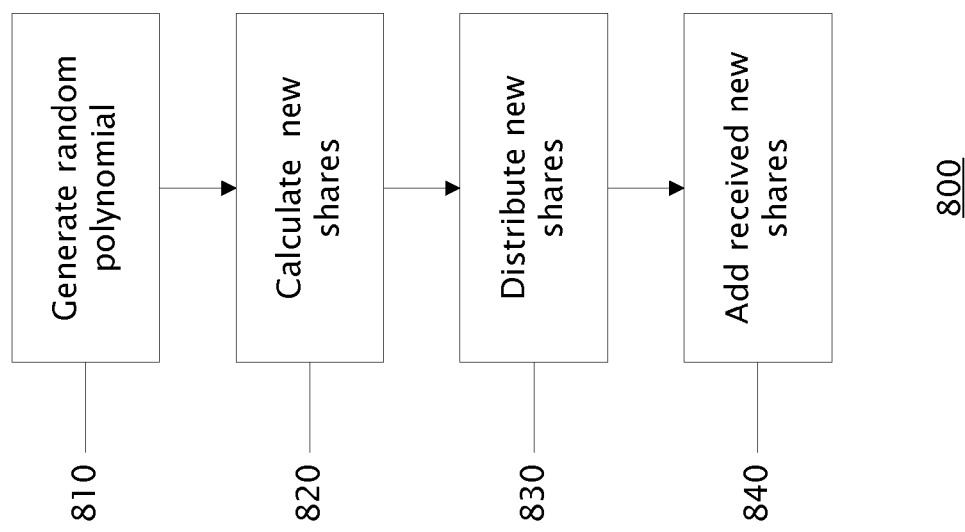

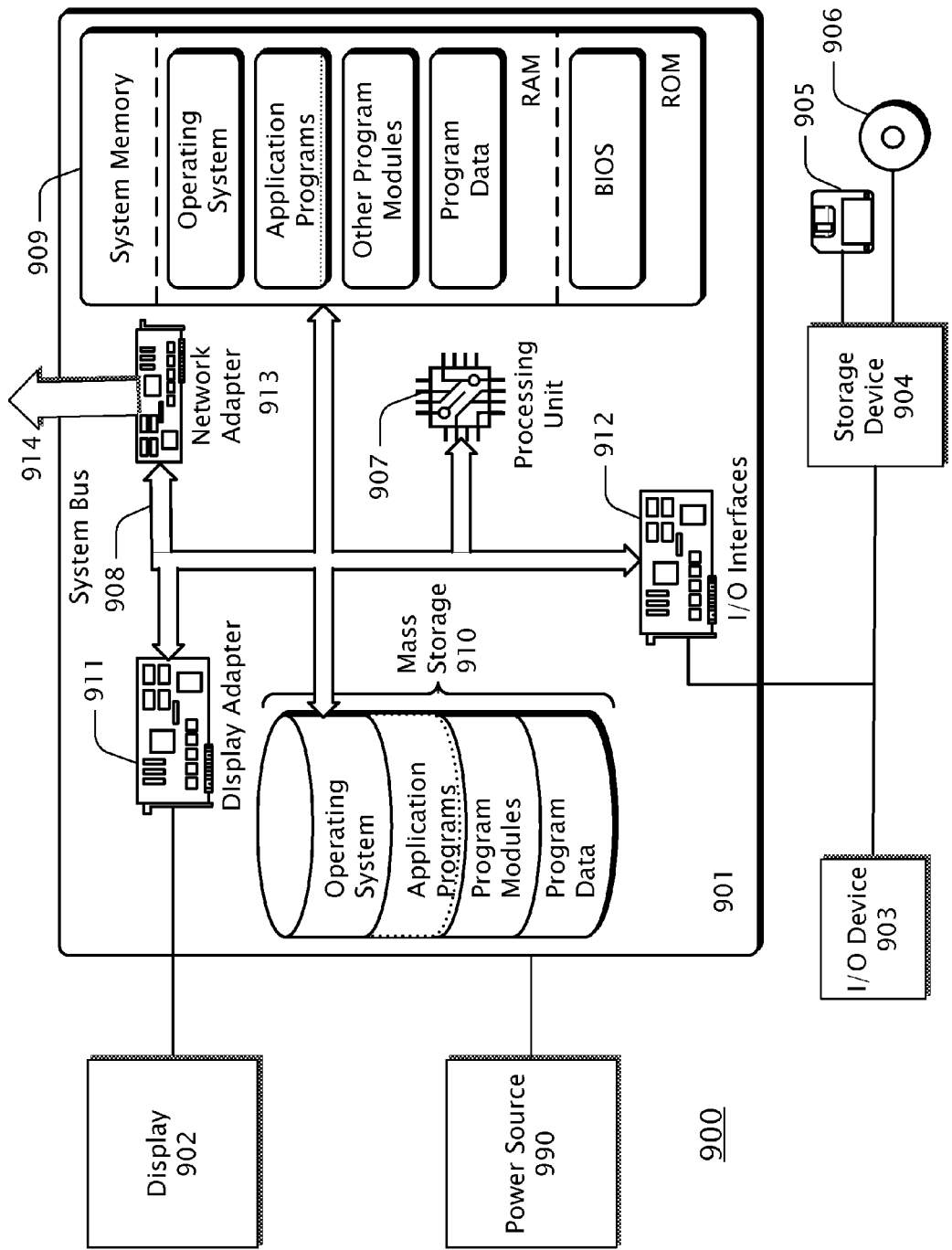

DISTRIBUTED SINGLE SIGN ON TECHNOLOGIES INCLUDING PRIVACY PROTECTION AND PROACTIVE UPDATING

RELATED APPLICATION(S)

This Application is a Continuation of, and claims priority to, U.S. patent application Ser. No. 12/276,428 that was filed on Nov. 24, 2008 and that is incorporated herein by reference in its entirety.

BACKGROUND

Conventional single sign on ("SSO") technologies have been used to enable users to log into different service providers via a single sign on. With such technologies, a user need only authenticate to a single entity in order to obtain access to a plurality of associated service providers or the like. Such is particularly helpful with the ever increasing number of web and other services requiring user authentication that a user may wish to access. Various SSO technologies are currently available including Kerberos and Microsoft's .NET Passport or Live ID. While Kerberos may be useful for a single domain environment, it is not considered suitable for use in untrusted environment such as the Internet. Technologies such as Live ID have greatly increased the availability of single sign on services for the Internet, but security issues remain. For example, compromising a single authentication server would jeopardize the whole system since replicas of credentials and profiles tend to be stored in the compromised server. Various distributed SSO systems attempt to address these and related issues. In one example, a plurality of authentication servers may return an encrypted partial ticket to a user that may be used to reconstruct a complete ticket useful for service access. Other techniques for such "secret splitting" methods may alternatively be used. But active attacks tend to not be considered in such schemes. That is, a compromised authentication server of a plurality of such servers may send out incorrect partial tickets or the like, resulting in incorrect tickets and resultant denial of access. Several other problems also exist with conventional distributed SSO technologies.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide for distributed single sign-on technologies operable to provide user access to a plurality of services via authentication to a single entity. The distributed single sign-on technologies provide a set of authentication servers and methods to split secret keys and user profiles into secure shares and to periodically update the shares among the authentication servers without changing the underlying secrets.

The foregoing summary is provided solely for the convenience of the Examiner. Accordingly, it should be appreciated that each of the claims may not be limited in the manner described in the summary above. Therefore, the Examiner is requested to not rely upon the summary above for determining whether each of the claims distinguishes over any prior art of record. Many of the attendant features of the claimed invention will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein:

FIG. 3 is a block diagram showing an example method for setting up a service provider S for operation with a DSSO system.

FIG. 4 is a block diagram showing an example method for setting up a user U for operation with a DSSO system.

FIG. 6 is an example method showing the operation of an example distributed single sign-on protocol in which no user profile information is sent to a service provider.

FIG. 7 is an example method 700 showing the operation of an example distributed single sign-on protocol in which user profile information is sent to a service provider.

FIG. 8 is a block diagram showing an example method for updating shares of secrets, such as secret key shares and user profile shares, without affecting the underlying secrets.

FIG. 9 is a block diagram showing an example computing environment in which the technologies described herein may be implemented.

Like reference numerals are used to designate like parts in the accompanying drawings.

DETAILED DESCRIPTION

Figure 1:
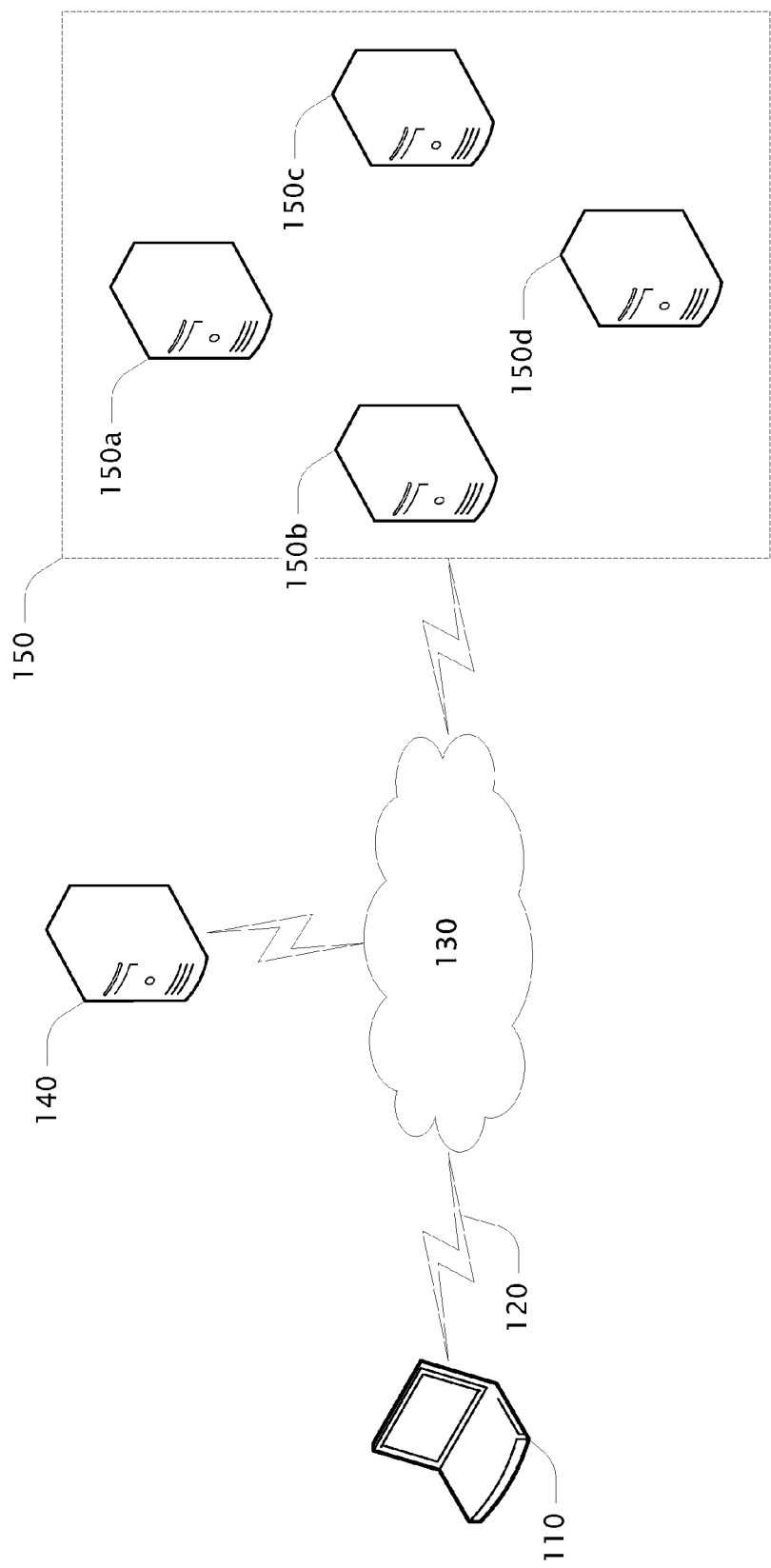
FIG. 1 is a block diagram showing an example distributed SSO ("DSSO") service or system A along with example user U and example service provider S.

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing and networking environment, the environment(s) described is provided as an example and not a limitation. As those skilled in the art will appreciate, the present examples are suitable for application in a variety of different types of computing and networking systems and environments.

Table 1 generally defines notation used herein to describe the present invention.

TABLE 1

| | Notation |
|---|---|
| S | A participating service provider. |
| U | A participating user who requests access to a service provided by S. |

TABLE 1-continued

Notation

| | |
|---|---|
| $A_i$ | The i-th authentication server which provides SSO service. |
| UID | A unique ID for user U. |
| SID | A unique ID for service provider S. |
| $AID_i$ | A unique ID for the i-th authentication server $A_i$. |
| $K_S$ | A secret key generated by and known only to S. |
| $K_S^i$ | The i-th partial share of $K_S$ generated with a threshold scheme. |
| $K_U^i$ | A secret key for U to authenticate to the i-th authentication server $A_i$. |
| p, q | Two large prime numbers with $p = 2q + 1$. |
| $G_q$ | A subgroup with order q of the multiplicative group $Z_p^*$. |
| $x_i$ | A unique public number in $Z_q \backslash \{0\}$ associated with the i-th authentication server. |
| g | A generator in $G_q$. |
| $SK_{U,A_i}$ | A session key between a user U and the i-th authentication server A. |
| $\langle m \rangle_k$ | A message m encrypted with a symmetric cipher and a key k. |
| n | The number of shares a secret or profile is split into. |
| t | A valid token or profile can not been constructed unless there are at least t arbitrary partial tokens or profiles available. |
| $N_{salt}$ | A salt. |
| $n_X$ | Nonce generated by entity X. |
| $r_X$ | A random number generated by entity X, $1 < r_X < q - 1$. |
| [.] | Optional part in describing a protocol. |
| Hash(.) | Cryptographic hash function. |
| $\mathcal{H}_1(.), \mathcal{H}_2(.)$ | Two cryptographic hash functions mapping arbitrary binary string into $G_q$. |
| $\mathcal{R}(.)$ | Reconstruction function to combine independent partial values. In this paper, the reconstruction function $\mathcal{R}$, is defined as $\mathcal{R}(\square_{d_j}, 1 \le j \le t) = \Pi_{i \in \{d_1, \ldots, d_t\}} (\square_{d_j})^{\lambda_i}$, where $\lambda_i = \prod_{1 \le j \le t, d_j \ne i} \frac{-x_{d_j}}{x_i - x_{d_j}} \mod q$. |

Note that number p is a conventional large prime number as those known to those of ordinary skill in the art. In one example, q is chosen as the Euler totient function of p, denoted as φ(p), which is the number of integers in the interval [1, p] which are relatively prime to p. In another example, p and q are chosen as large prime numbers such that p=2q+1, as shown in Table 1. A more general selection is that q is a large prime number that divides φ(p).

FIG. 1 is a block diagram showing an example distributed SSO ("DSSO") service or system A 150 along with example user U 110 and example service provider S 140. User 110, service provider 140, and DSSO system 150 are typically coupled via network 130 and links such as link 120. In one example, network 130 is the Internet. In other examples, network 130 may be any network or combination of networks or the like. User 110 typically represents a computing device or environment, such as that described in connection with FIG. 9, or any other type of computing device or system or the like. Such a device may be operated by a human, or operate standalone or as part of a larger system. Service provider 140 typically represents any type of electronic service or the like including network services, Internet or Web services, or any other such service or combination of services that is associated with DSSO system 150. DSSO system 150 is also referred to herein as a set of authentication servers. Example gset 150 is shown including authentication servers 150a, 150b, 150c, and 150d, but may in practice include any number n of such servers where each authentication server is represented as an i-th authentication server $\{A_i | 1 \le i \le n\}$. Further, such servers may be physically located proximate to each other or be distributed over a large geographic area. Such servers are typically coupled via one or more networks or the like, not shown in FIG. 1.

Figure 2:
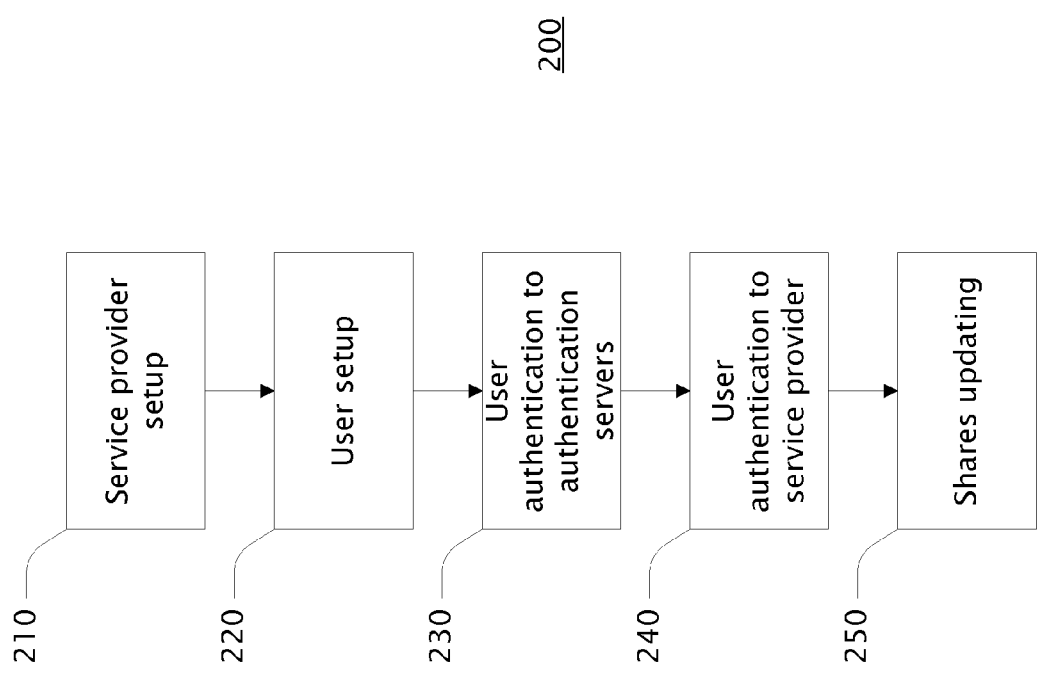
FIG. 2 is a block diagram showing an example method for setting up a DSSO system.

FIG. 2 is a block diagram showing an example method 200 for setting up a DSSO system 150. Block 210 typically indicates setup of service provider S, such as service provider 140 of FIG. 1, for operation with a DSSO system, such as DSSO system 150 of FIG. 1. Such setup typically includes S generating a secret key, splitting it into n shares, and distributing a distinct one of the secret key shares to each of the n authentication servers in set A. Thus each authentication server in set A receives a unique share of the split secret key. Such service provider setup is described further in connection with FIG. 3.

Block 220 typically indicates setup of user U, such as user 110 of FIG. 1, for operation with a DSSO system, such as DSSO system 150 of FIG. 1. Such setup typically includes splitting a user profile corresponding to U into n shares, and distributing a distinct one of the user profile shares to each of the n authentication servers in set A. Thus each authentication server in set A receives a unique share of the split user profile. Such user setup is described further in connection with FIG. 4.

Block 230 typically indicates U, such as user 110 of FIG. 1, registering authentication credentials with $A_i$ such as DSSO system 150 of FIG. 1, and authenticating to A. In general, user U needs to authenticate to authentication servers A before receiving DSSO services. Such registering and authenticating are described further in connection with FIG. 5.

Block 240 typically indicates U, such as user 110 of FIG. 1, authenticating to S, such as service provider 140 of FIG. 1, in order to access the services offered by S. When user U wants to access a service provided by S, U typically receives partial tokens and profiles from t of the set of authentication servers A (where $1 \le t \le n$), and constructs a token and a profile that only the designated service provider S can verify or view. The token is used to authenticate U to S, and the profile is used to provide the U's information to S. Such authenticating is described further in connection with FIG. 6 and FIG. 7.

Block 250 typically indicates periodically updating secret key shares and/or user profile shares such as those described in connection with blocks 210 and 220. Such updating is further described in connection with FIG. 8.

FIG. 3 is a block diagram showing an example method 300 for setting up a service provider S, such as service provider 140 of FIG. 1, for operation with a DSSO system, such as DSSO system 150 of FIG. 1.

Block 310 typically indicates service provider S generating a secret key $K_s$. In this example, the secret key $K_s$ is a number where $1 < K_s < q-1$. Once the secret key is generated, then method 300 typically continues at block 320.

Block 320 typically indicates service provider S selecting a random polynomial $f(x) = K_s + a_1 x + a_2 x^2 + \ldots + a_{t-1} x^{t-1}$ of order t−1 with random coefficients $a_i$ in $Z_q$: $\{a_i \epsilon Z_q\}$ except the constant which is set to $K_s$, where $Z_q$ is a set of integers from 0 to q−1, as shown in block 320, the random polynomial being used to split the secret key $K_s$ generated at block 310 into n distinct shares $K_s^i = f(x_i)$, $\{x_i \epsilon Z_q \backslash \{0\}\}$, $1 \le i \le n$, each distinct share $K_s^i$ associated with the related authentication server $A_i$ of set A. In this example, any t shares (where $1 \le t \le n$) of $K_s$ can be used to reconstruct the value of $K_s$. Once secret key $K_s$ has been split into n shares, method 300 typically continues at block 330.

Block 330 typically indicates service provider S sending a distinct secret key share $K_s^i$ to each authentication server $A_i$ in set A. The sending to each authentication server $A_i$ typically includes a unique identifier SID of service provider S as shown in block 330. The sending to each authentication server $A_i$ may also include values $g^{\alpha_1}, \ldots, g^{\alpha_{t-1}}, g^{K_s}$ as shown in block 330. Once the sending is completed, method 300 typically continues at block 340.

Block 340 typically indicates each authentication server $A_i$ storing the secret key share $K_s^i$, the SID value, and the optional values, and verifying the secret key share sent from service provider S and acknowledging the verification to service provider S. Each authentication server $A_i$ may verify the sent secret key share $K_s^i$ using the optional values $g^{\alpha_1}, \ldots, g^{\alpha_{t-1}}, g^s$ by checking whether the following equation holds:

$$g^{K_s^i} = g^{K_s}(g^{\alpha_1})^{x_i} \ldots (g^{\alpha_{t-1}})^{x_i^{t-1}}.$$

If, using the foregoing equation and the sent optional values, it is determined that the sent secret key share $K_s^i$ is valid, then the authentication server $A_i$ generally sends a "Success" indication back to service provider S. Otherwise a "Failure" indication may be sent back to service provider S. Once the sent values are stored, the secret key share is verified, and a verification indication is sent back to service provider S, then method 300 is typically complete.

Overall, knowledge of any t shares (where $1 \leq t \leq n$) of secret key $K_s$ can be used to reconstruct the value of secret key $K_s$. But knowledge of any t−1 or fewer shares of secret key $K_s$ and all the values $g^{\alpha_1}, \ldots, g^{\alpha_{t-1}}, g^{K_s}$ are not sufficient to deduce secret key $K_s$.

FIG. 4 is a block diagram showing an example method 400 for setting up a user U, such as user 110 of FIG. 1, for operation with a DSSO system, such as DSSO system 150 of FIG. 1. In some examples, a service provider, such as service provider S or service provider 140 of FIG. 1, may need to know some information about a user to which it grants access. A user may have several user profiles comprising personal information or the like of different levels of sensitivity. For example, one such profile may comprise only basic personal information such as a user identifier ("ID") and email address or the like. Another user profile may comprise more sensitive information such as a credit card number or the like. Different service providers may receive user profiles of differing levels of sensitivity from an authentication server.

Like a secret key $K_s$, user profiles may also benefit from being protected. In one example, protection may be provided by splitting a user profile into n shares that are then distributed to the n authentication servers in set A. Each authentication server stores a share of the user profile but cannot deduce the content of the user profile unless there are t or more colluding authentication servers, each with a unique valid share of the user profile.

Block 410 typically indicates user U generating a secret number $\Gamma_U$. In this example, the secret number $\Gamma_U$ is a number where $1 < \Gamma_U < q-1$. Further, user U generally calculates $\Gamma_U^{-1}$ mod q. Once the secret number is generated and the calculation is complete, then method 400 typically continues at block 420.

Block 420 typically indicates user U selecting a random polynomial $w(x) = \Gamma_U + b_1 x + b_2 x^2 + \ldots + b_{t-1} x^{t-1}$ of order t−1 with random coefficients $b_i$), in $Z_q$: $\{b_i \in Z_q\}$, and with a constant $\Gamma_U$ as shown in block 420, the random polynomial being used to split the secret number $\Gamma_U$ generated at block 410 into n shares $P_U^i = w(x_i)$, $1 \leq i \leq n$ and then calculates an encrypted user profile $P_{f,\Gamma} = (P_f)^{\Gamma_U^{-1}}$, where $P_f$ is a user profile mapping, i.e., a number in $G_q$: $P_f \in G_q$ that a user profile is one-to-one mapped to. An example of mapping for the case that q and p=2q+1 are two prime number is as follows: if a user profile can be represented by a bit-string less than q, denoted as Profile, then a mapping from Profile to $P_f \in G_q$ can be:

$P_f = 2*\text{Profile}+1$, if $2*\text{Profile}+1$ is a quadratic residue mod q.

$P_f = q - 2*\text{Profile}-1$, if $2*\text{Profile}+1$ is not a quadratic residue mod q.

Recall that an integer X, $0 \leq X \leq q$, is called a quadratic residue mod q if and only if there is an integer Y such that $Y^2 = X$ mod q. If a user profile is too long such that it cannot be represented by a bit-string less than q then, in one example, $P_f$ is an encryption key belonging to $G_q$ that is used to encrypt a user profile with a symmetric encryption primitive such as the Advanced Encryption Standard ("AES"). In this case, $P_{f,\Gamma} = (P_f)^{\Gamma_U^{-1}}$ is an encrypted version of the symmetric encryption key $P_f$ instead of an encrypted version of the user profile mapping. In addition, the encrypted user profile is typically sent along with $P_{f,\Gamma}$, and a service provider S calculates $P_f$ and then uses it to decrypt the received encrypted user profile sent to it together with $P_{f,\Gamma}$ to obtain the user profile. In this example, any t shares (where $1 \leq t \leq n$) of the split user profile can be used to reconstruct the use profile. Once secret number $\Gamma_U$ has been split into n shares and the user profiles shares calculated, method 400 typically continues at block 430.

Block 430 typically indicates user U sending a distinct secret share $P_U^i$ together with the encrypted user profile $P_{f,\Gamma}$ to each authentication server $A_i$ in set A. The sending to each authentication server $A_i$ typically includes a unique identifier UID of the user U as shown in block 430. The sending to each authentication server $A_i$ may also include optional values $g^{b_1}, \ldots g^{b_{t-1}}, g^{\Gamma_U}$ as shown in block 430. Once the sending is completed, method 400 typically continues at block 440.

Block 440 typically indicates each authentication server $A_i$ calculating a user profile share $$P_{f,\Gamma}^i = P_{f,\Gamma}^{P_U^i}$$

from the received $P_U^i$ and $P_{f,\Gamma}$, and storing $P_{f,\Gamma}^i$, $P_{f,\Gamma}$, the UID value, and the optional values, and verifying the user profile share sent from user U and acknowledging the reception back to user U. Each authentication server $A_i$ may verify the sent user secret share $P_U^i$ using the optional values $g^{b_1}, \ldots, g^{b_{t-1}}, g^{\Gamma_U}$ by checking whether the following equation holds:

$$g^{P_U^i} = g^{\Gamma_U}(g^{b_1})^{x_i} \ldots (g^{b_1})^{x_i^{t-1}}$$

If, using the foregoing equation and the sent optional values, it is determined that the sent user secret share $P_U^i$ is valid, then the authentication server $A_i$ generally sends a "Success" indication back to service provider S. Otherwise a "Failure" indication may be sent back to service provider S. Once the sent values are stored, the secret key share is verified, and a verification indication is sent back to service provider S, then method 400 is typically complete.

Overall, knowledge of any r shares (where $1 \leq t \leq n$) of the user profile can be used to reconstruct the user profile. But knowledge of any t−1 or fewer shares of the user profile and all the values $g^{b_1}, \ldots, g^{b_{t-1}}, g^{\Gamma_U}$ are not sufficient to deduce the user profile.

Figure 5:
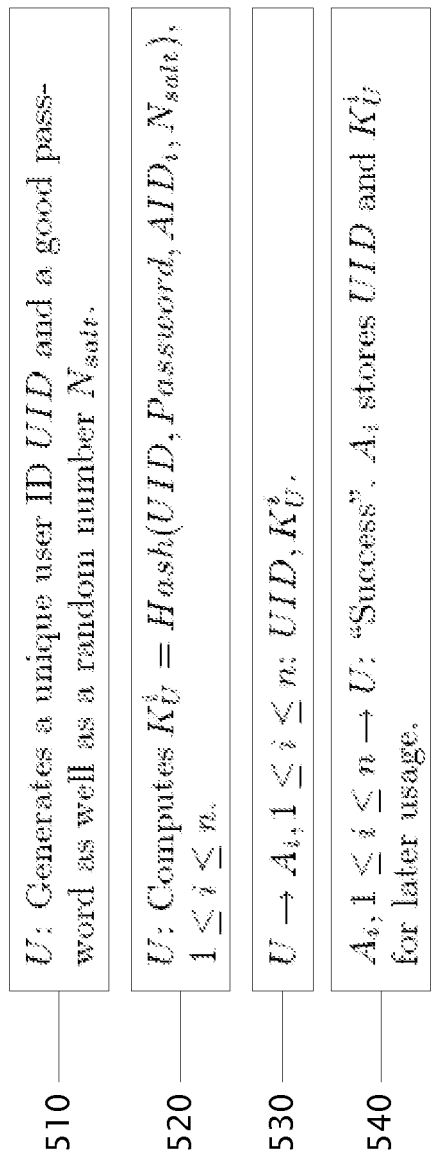
FIG. 5 is a block diagram showing an example method for registering and authenticating a user U to authentication servers in set A.

FIG. 5 is a block diagram showing an example method 500 for registering and authenticating a user U, such as user 110 of FIG. 1, to authentication servers in set A, such as set 150 of FIG. 1. In general, a user of a DSSO system, such as DSSO system 150 of FIG. 1, needs to authenticate to authentication servers in set A before receiving services of the system. Such authentication may typically be based on any authentication scheme, including a conventional scheme such as password-based authentication. In one example, each authentication server $A_i$ in set A operates and authenticates users independently. Each authentication server $A_i$ in set A uses the same user ID for a particular user, but uses a different password in authenticating the user. To the user, authentication appears to be conventional: that is, a user only needs to provide a single user ID and password. A portion (typically a client-side portion or a web browser plug-in or the like) of DSSO system 150, responsive to the user-provided password, manages the complexity of generating a unique password registered with each authentication server $A_i$ in set A.

Block 510 typically indicates a user U, such as user 110 of FIG. 1, generating a unique user ID and a user password. Further, a random number $N_{salt}$ of high entropy is generated. In this example, user U may refer to a human or system user, and/or to a portion of a DSSO system with which a user interacts, such as a client portion or a web browser plug-in or the like. Once the user ID and such are generated, method 500 typically continues at block 520.

Block 520 typically indicates user U computing an authentication password $K_U^i$ for each authentication server in set A where $1 \leq i \leq n$ and where n is the number of authentication servers in set A. In this example, each of the n authentication passwords is computed as $K_U^i$=Hash(UID, Password, $AID_i$, $N_{salt}$), $1 \leq i \leq n$ where Hash( ) is a hash function usable for generating a high entropy password, and where UID is the user ID of block 510, and where Password is the user password of block 510, and where $AID_i$ is a unique identifier for the i-th authentication server $A_i$ in set $A_i$ and where $N_{salt}$ is the high-entropy random number of block 510. In this example, the salt value $N_{salt}$ is not a secret, but is generally kept from the authentication servers. Once the authentication passwords have been computed, method 500 typically continues at block 530.

Block 530 typically indicates user U sending each authentication password $K_U^i$ and the user ID to the corresponding authentication server $A_i$ in set A. Once the authentication passwords are sent to their corresponding authentication servers, method 500 typically continues at block 540.

Block 540 typically indicates each authentication server $A_i$ in set A returning a "Success" indication upon successfully receiving an authentication password from user U. Otherwise a "Failure" indication may be sent back to user U. Further, each authentication server typically stores the authentication password and corresponding user ID for later use, such as for user authentication. At this point user U is registered with each authentication server $A_i$ in set A and method 500 is typically complete.

Once registered, in order to receive DSSO system services, a user generally needs to authenticate to the system. Any suitable authentication protocol may be used. In one example, a simple challenge/response protocol that makes use of the user ID, user password, and authentication passwords generated by method 500 or the like is suitable. The authentication protocol is typically used to authenticate the user to each authentication server $A_{d_j}$ where $1 \leq j \leq t$ and where j is the number of secret key shares and/or user profile shares. Once authenticated to the DSSO system a session key $SK_{U,A_{d_j}}$ is typically returned to user U for each authentication server $A_{d_j}$. The session keys are typically used to establish a secure communications channel between user U and each authentication server $A_{d_j}$, the secure communication channels usable to provide DSSO system single sign-on services to user U.

In one example, a single sign-on protocol of a DSSO system, such as DSSO system 150 of FIG. 1, makes use of two non-interactive zero-knowledge proofs, denoted as DLEQ and DLEQ2:

DLEQ($g_1$, $h_1$, $g_2$, $h_2$) is a pair (c, s) used to prove that $\log_{g_1} h_1 = \log_{g_2} h_2$ for $g_1$, $h_1$, $g_2$, $h_2 \in G_q$, where c=Hash($g_1$, $h_1$, $g_2$, $h_2$, $g_1^s h_1^c$, $g_2^s h_2^c$).

Suppose Alice knows $x = \log_{g_1} h_1 = \log_{g_2} h_2$, then she can choose a random value r and computes c=Hash($g_1$, $h_1$, $g_2$, $h_2$, $g_1^r$, $g_2^r$) and s=r−cx mod q. Therefore c=Hash($g_1$, $h_1$, $g_2$, $h_2$, $g_1^s h_1^c$, $g_2^s h_2^c$).

DLEQ2($g_1$, $h_1$, $g_2$, $h_2$, u, v, w) is a triple (c, $s_1$, $s_2$) used to prove that $u^{\log_{g_1} h_1} v^{\log_{g_2} h_2} = w$ for $g_1$, $h_1$, $g_2$, $h_2$, u, v, $w \in G_q$, where c=H ash($g_1$, $h_1$, $g_2$, $h_2$, u, v, w, $g_1^{s_1} h_1^c$, $g_2^{s_2} h_2^c$, $u^{s_1} v^{s_2} w^c$).

Suppose Alice knows $x = \log_{g_1} h_1$ and $y = \log_{g_2} h_2$, she can choose random values $r_1$ and $r_2$, and then computes c=H ash($g_1$, $h_1$, $g_2$, $h_2$, u, v, w, $g_1^{r_1}$, $g_2^{r_2}$, $u^{r_1} v^{r_2}$), $s_1 = r_1 - cx$ mod q, and $s_2 = r_2 - cy$ mod q. Therefore c=H ash($g_1$, $h_1$, $g_2$, $h_2$, u, v, $g_1^{s_1} h_1^c$, $g_2^{s_2} h_2^c$, $u^{s_1} v^{s_2} w^c$).

FIG. 6 is an example method 600 showing the operation of an example distributed single sign-on protocol in which no user profile information is sent to a service provider. Block 610 typically indicates a user U, such as user 110 of FIG. 1, sending to a service provider S, such as service provider 140 of FIG. 1, a request to access a service. Once the request is received, method 600 typically continues at block 620.

Block 620 typically indicates the service provider S, responsive to the request, returning a set of values to the user U. In this example, the set of values includes the unique identifier SID of the service provider S, a nonce $n_s$ generated by the service provider S, the value $g^{r_s}$ calculated by the service provider S based on a random number $r_s$, $1 < r_s < q-1$, selected by the service provider, and a list of at least t authentication servers $\{A_{d_j}, 1 \leq j \leq t\}$. The j authentication servers used in the protocol are any of the t operational authentication servers in set A, and are typically selected based on workload, bandwidth, processing power, reliability, and/or the like. Further, it is possible to send requests to more than j authentication servers. In this case, the first j partial tokens received from the authentication servers are typically used to compute an authentication token as described in connection with block 660. Once the set of values is returned to the user U, then method 600 typically continues at block 630.

Block 630 typically indicates the user U selecting a random number $r_U$, $1 < r_U < q-1$ and calculating $g^{r_U}$. This term may be used in generating a session key for use between the user U and the service provider S after successful completion of the distributed single sign-on protocol. Further, block 630 typically indicates performing the actions indicated by blocks 640 and 650 for each j where $1 \leq j \leq t$ and where j is the minimum number of secret key shares and/or user profile shares needed to reconstruct the secret key or user profile.

Block 640 typically indicates the user U sending a set of values to each authentication server $A_{d_j}$. In this example, the set of values includes the unique identifier UID of the user U, the unique identifier SID of the service provider S, the nonce $n_s$ generated by the service provider S, and the a pair of values including the value $g^{r_s}$ calculated by the service provider S and the value $g^{r_u}$ calculated by the user U. Once the set of values has been sent, method 600 typically continues at block 650.

Block 650 typically indicates each authentication server $A_{d_j}$, responsive to the sending of block 640, sending the indicated set of values to the user U. In this example, DLEQ is generally used to verify if authentication server sent a correct partial authentication token $T_{d_j}$. Once the set of values sent by each authentication server $A_{d_j}$ have been received by the user U, method 600 typically continues at block 660.

Block 660 typically indicates the user U computing an authentication token $h^{K_s}=R(T_{d_j}, 1\leq j\leq t)$ from the j received partial authentication tokens $T_{d_j}$. Once the authentication token has been computed, the user U typically sends the user ID, UID, the calculated $h^{K_s}$, and optionally $g^{r_U}$ to the server S. Then method 600 typically continues at block 670.

Block 670 typically indicates the service provider S verifying the authentication token $h^{K_s}$ by calculating $h_s=\mathcal{H}_1$(UID, SID, $n_s$, $[g^{r_s}, g^U]$) and then using the secret key $K_s$ known only to itself to check if $h_s^{K_s}=h^{K_s}$ holds, where $h^{K_s}$ is received from the user U. If the equation holds, then user U is granted access to the requested service. Otherwise access is denied. Once access is granted, if a secure communication channel between the user U and the service provider S is desired then, in this example, the value $g^{r_U r_s}$ is used as a session key for the secure communication channel. Such a session key may be generated based on Diffie-Hellman key agreement. At this point, method 600 is typically complete.

FIG. 7 is an example method 700 showing the operation of an example distributed single sign-on protocol in which user profile information is sent to a service provider. Method 700 is essentially the same as method 600 but further includes securely providing a user profile to the service provider S. Block 710 typically indicates a user U, such as user 110 of FIG. 1, sending to a service provider S, such as service provider 140 of FIG. 1, a request to access a service. Once the request is received, method 700 typically continues at block 720.

Block 720 typically indicates the service provider S, responsive to the request, returning a set of values to the user U. In this example, the set of values includes the unique identifier SID of the service provider S, a nonce $n_s$ generated by the service provider S, the value $g^{r_s}$ calculated by the service provider S based on a random number $r_s$, $1<r_s<q-1$, selected by the service provider, and a list of t authentication servers $\{A_{d_j}, 1\leq j\leq t\}$. Once the set of values is returned to the user U, then method 700 typically continues at block 730.

Block 730 typically indicates the user U selecting a random number $r_U$, $1<r_U<q-1$ and calculating $g^{r_U}$. This term may be used in generating a session key for use between the user U and the service provider S after successful completion of the distributed single sign-on protocol. Further, block 730 typically indicates performing the actions indicated by blocks 740 and 750 for each j where $1\leq j\leq t$ and where j is the minimum number of secret key shares and/or user profile shares needed to reconstruct the secret key or user profile.

Block 740 typically indicates the user U sending a set of values to each authentication server $A_{d_j}$. In this example, the set of values includes the unique identifier UID of the user U, the unique identifier SID of the service provider S, the nonce $17_s$ generated by the service provider S, and the a pair of values including the value $g^{r_s}$ calculated by the service provider S and the value $g^{r_U}$ calculated by the user U. Once the set of values has been sent, method 700 typically continues at block 750.

Block 750 typically indicates each authentication server $A_{d_j}$, responsive to the sending of block 740, sending the indicated set of values to the user U. In this example, DLEQ and DLEQ2 are generally used to prevent active attacks launched by compromised authentication servers. DLEQ is generally used to verify if authentication server $A_{d_j}$ sent a correct partial authentication token $T_{d_j}$. DLEQ2 is generally used to verify if authentication server $A_{d_j}$ sent a correct partial profile token $T_d^{j^t}$. Once the set of values sent by each authentication server $A_{d_j}$ have been received by the user U, method 700 typically continues at block 760.

Block 760 typically indicates the user U computing an authentication token $h^{K_s}=R(T_{d_1}, 1\leq j\leq t)$ from the j received partial authentication tokens $T_{d_j}$. Further, block 760 typically indicates the user U computing a user profile mapping $P_f$ encrypted with the service provider S secret key $K_s$, $h'^{K_s}P_f=R(T'_{d_j}, 1\leq j\leq t)$. Once the authentication token $h^{K_s}$ and encrypted user profile mapping $h'^{K_s} P_f$ have been computed, the user sends them as well as UID and optionally $g^{r_U}$ to the service provider S. Method 700 then typically continues at block 770.

Block 770 typically indicates the service provider S calculating $h_s=\mathcal{H}_1$(UID, SID, $n_s$, $[g^{r_s}, g^{r_U}]$) and $h'_s=\mathcal{H}_2$(UID, SID, $n_s$, $[g^{r_s}, g^{r_U}]$) and then uses the secret key $K_s$ known only to itself to check if $h_s^{K_s}=h^{K_s}$ holds and extracts the user profile mapping $P_f=h'^{K_s}P_f/h'_s{}^{K_s}$, where $h^{K_s}$ and $h'^{K_s} P_f$ are received from the user U. If the equation holds, then user U access to the requested service is granted. Otherwise access is denied. At this point, method 700 is typically complete.

FIG. 8 is a block diagram showing an example method 800 for updating shares of secrets, such as secret key shares and user profile shares, without affecting the underlying secrets. In general, DSSO system secrets such as secret keys and user profiles are protected by splitting them into shares that are distributed among a set of authentication servers. But given a sufficient amount of time, attackers may eventually compromise a large enough number of the shares to deduce a secret. To thwart such an attack, secret share in a DSSO system may be updated periodically using a proactive share updating method, such as method 800. In this example, in order for an attacker to compromise the DSSO system, the attacker would have to compromise a sufficient number of secret shares in order to deduce a secret before such shares are updated. Implementing proactive share updating can make such compromising very difficult.

With respect to updating secret key shares $K_s^i$, block 810 typically indicates each authentication server $A_i$ generating a random polynomial $f_{i,update}(x)$ of order $t-1$ with random coefficients and with a constant of 0:

$$f_{i,update}(x)=\alpha_{i,1}x+\ldots+\alpha_{i,t-x}{}^{t-1}.$$

Once the random polynomial is generated, method 800 typically continues at block 820.

With respect to updating secret key shares $K_s^i$, block 820 typically indicates authentication server $A_i$ calculating updating values $K_{ij}=f_{i,update}(x_j)$, $1\leq j\leq n$. Once the updating values have been calculated, method 800 typically continues at block 830.

With respect to updating secret key shares $K_s^i$, block 830 typically indicates authentication server $A_i$ distributing the updating values $K_{ij}$ to all other authentication servers in set A. Further, the authentication server $A_i$ typically broadcasts the values $g^{\alpha_{i,1}}, \ldots g^{\alpha_{i,t-1}}$ to all the other authentication servers in set A. Once the distributing and broadcasting are complete, method 800 typically continues at block 840.

With respect to updating secret key shares $K_s^i$, block 840 typically indicates authentication server $A_i$ receiving updating values $K_{j,i}$ from each of the other authentication servers in set A. and verifying whether $g^{K_{ij}}=(g^{\alpha_{j,i}})^{x_j} \ldots (g^{\alpha_{j,t-1}})$ or not, where $1\leq j\leq n$. If the equation holds, the new shares are added to the original share $K_s^i$, resulting in the new updated share:

$$K_S^{\prime i} = K_S^i + \sum_{j=1}^{n} K_{j,i}$$

Accordingly, the corresponding new secret key share polynomial $f_{new}(x)$ is the summation of the original polynomial $f(x)$ and all the randomly generated polynomials $f_{i,update}(x)$, such that $K_S^{\prime i}$ is the secret key share generated from $f_{new}(x)$. Thus the secret key share $K_s^i$ at each authentication server $A_i$ in set A is updated without changing the secret key $K_s$.

With respect to updating user profile shares $P_U^i$, block 810 typically indicates each authentication server $A_i$ generating a random polynomial $w_{i,update}(x)$ of order t−1 with random coefficients and with a constant of 0:

$$w_{i,update}(x) = \beta_{i,1} x + \ldots + \beta_{i,t-1} x^{t-1}$$

Once the random polynomial is generated, method 800 typically continues at block 820.

With respect to updating user profile shares $P_U^i$, block 820 typically indicates authentication server $A_i$ calculating updating values $W_{ij} = w_{i,update}(x_j)$, $1 \le j \le n$. Once the updating values have been calculated, method 800 typically continues at block 830.

With respect to updating user profile shares $P_U^i$, block 830 typically indicates authentication server $A_i$ distributing the updating values $W_{ij}$ to all other authentication servers in set A. Further, the authentication server $A_i$ typically broadcasts the values $g^{\beta_{i,1}}, \ldots, g^{\beta_{i,t-1}}$ to all the other authentication servers in set A. Once the distributing and broadcasting are complete, method 800 typically continues at block 840.

With respect to updating user profile shares $P_U^i$, block 840 typically indicates authentication server $A_i$ receiving updating values from each of the other authentication servers in set A. and verifying whether $g^{w_{ij}} = (g^{\beta_{j,1}})^{x_j} \ldots (g^{\beta_{j,j-1}})^{x_j^{t-1}}$ or not, where $1 \le j \le n$. If the equation holds, the new shares are added to the original share $P_U^i$, resulting in the new updated share:

$$P_U^{\prime i} = P_U^i + \sum_{j=1}^{n} W_{j,i}$$

Accordingly, the corresponding new user profile share polynomial $w_{new}(x)$ is equal to original polynomial $w(x) + \Sigma_{j=1} w_{i,update}(x)$. Each authentication server $A_i$ then uses the new share $P_U^{\prime i}$, and the stored $P_{f,\Gamma}$ to update its user profile share $$P_{f,\Gamma}^{\prime i} = P_{f,\Gamma}^{P_U^{\prime i}}.$$

Thus the user profile share $P_U^i$ at each authentication server $A_i$ in set A is updated without changing the user profile $P_f$.

FIG. 9 is a block diagram showing an example computing environment 900 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 900 typically includes a general-purpose computing system in the form of a computing device 901 coupled to various components, such as peripheral devices 902, 903, 904 and the like. System 900 may couple to various other components, such as input devices 903, including voice recognition, touch pads, buttons, keyboards and/or pointing devices, such as a mouse or trackball, via one or more input/output ("I/O") interfaces 912. The components of computing device 901 may include one or more processors (including central processing units ("CPU"), graphics processing units ("GPU"), microprocessors ("µP"), and the like) 907, system memory 909, and a system bus 908 that typically couples the various components. Processor 907 typically processes or executes various computer-executable instructions to control the operation of computing device 901 and to communicate with other electronic and/or computing devices, systems or environment (not shown) via various communications connections such as a network connection 914 or the like. System bus 908 represents any number of several types of bus structures, including a memory bus or memory controller, a peripheral bus, a serial bus, an accelerated graphics port, a processor or local bus using any of a variety of bus architectures, and the like.

System memory 909 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 909 typically stores data, computer-executable instructions and/or program modules comprising computer-executable instructions that are immediately accessible to and/or presently operated on by one or more of the processors 907.

Mass storage devices 904 and 910 may be coupled to computing device 901 or incorporated into computing device 901 via coupling to the system bus. Such mass storage devices 904 and 910 may include non-volatile RAM, a magnetic disk drive which reads from and/or writes to a removable, non-volatile magnetic disk (e.g., a "floppy disk") 905, and/or an optical disk drive that reads from and/or writes to a non-volatile optical disk such as a CD ROM, DVD ROM 906. Alternatively, a mass storage device, such as hard disk 910, may include non-removable storage medium. Other mass storage devices may include memory cards, memory sticks, tape storage devices, and the like.

Any number of computer programs, files, data structures, and the like may be stored in mass storage 910, other storage devices 904, 905, 906 and system memory 909 (typically limited by available space) including, by way of example and not limitation, operating systems, application programs, data files, directory structures, computer-executable instructions, and the like. The term "computer-readable media (as opposed to the term "communications media") as used herein refers strictly to a statutory article of manufacture that is not a signal or carrier wave per se.

Output components or devices, such as display device 902, may be coupled to computing device 901, typically via an interface such as a display adapter 911. Output device 902 may be a liquid crystal display ("LCD"). Other example output devices may include printers, audio outputs, voice outputs, cathode ray tube ("CRT") displays, tactile devices or other sensory output mechanisms, or the like. Output devices may enable computing device 901 to interact with human operators or other machines, systems, computing environments, or the like. A user may interface with computing environment 900 via any number of different I/O devices 903 such as a touch pad, buttons, keyboard, mouse, joystick, game pad, data port, and the like. These and other I/O devices may be coupled to processor 907 via I/O interfaces 912 which may be coupled to system bus 908, and/or may be coupled by other interfaces and bus structures, such as a parallel port, game port, universal serial bus ("USB"), fire wire, infrared ("IR") port, and the like.

Computing device 901 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 901 may be coupled to a network via network adapter 913 or the like, or, alternatively, via a modem, digital subscriber line ("DSL") link, integrated services digital network ("ISDN") link, Internet link, wireless link, or the like.

Communications connection 914, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 990, such as a battery or a power supply, typically provides power for portions or all of computing environment 900. In the case of the computing environment 900 being a mobile device or portable device or the like, power source 990 may be a battery. Alternatively, in the case computing environment 900 is a desktop computer or server or the like, power source 990 may be a power supply designed to connect to an alternating current ("AC") source, such as via a wall outlet.

Some mobile devices may not include many of the components described in connection with FIG. 9. For example, an electronic badge may be comprised of a coil of wire along with a simple processing unit 907 or the like, the coil configured to act as power source 990 when in proximity to a card reader device or the like. Such a coil may also be configure to act as an antenna coupled to the processing unit 907 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 902, I/O device 903, or many of the other components described in connection with FIG. 9. Other mobile devices that may not include many of the components described in connection with FIG. 9, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method comprising:
sending, by a computing device, a request for access;
receiving, by the computing device in response to the sent request, a list of t authentication devices, a unique service identifier, and a value;
sending, by the computing device for each j where $1<j \leq t$, data comprising a user identifier of a user, the unique service identifier, the value, and a random number;
receiving, by the computing device in response to the sent data for each j, a partial authentication token based on the sent user identifier, the sent unique service identifier, the sent value, and the sent random number;
computing, by the computing device, an authentication token based on j of the received partial authentication tokens, where $1 \leq j \leq t$;
sending, by the computing device, the authentication token;
receiving, by the computing device in response to the sent authentication token, the requested access.

2. The method of claim 1 further comprising receiving, in response to any of the received partial authentication tokens being incorrect, a denial to the requested access.

3. The method claim 1 wherein j is the number of partial authentication tokens required for the computing the authentication token.

4. The method of claim 1 wherein each correct partial authentication ken represents a share of a secret key required for the requested access.

5. The method of claim 1 wherein the authentication token represents a secret key required for the requested access.

6. The method of claim 1 wherein the user is a user of the computing device.

7. The method of claim 1 wherein the receiving the requested access is dependent on a session key based on a random number.

8. At least one computer-readable media storing computer-readable instructions that, when executed by a computing device, cause the computing device to perform a method comprising:

sending a request for access;

receiving, in response to the sent request, a list of t authentication devices, a unique service identifier, and a value;

sending, for each j where $1 < j \leq t$, data comprising a user identifier of a user, the unique service identifier, the value, and a random number;

receiving, in response to the sent data for each j, a partial authentication token based on the sent user identifier, the sent unique service identifier, the sent value, and the sent random number;

computing an authentication token based on j of the received partial authentication tokens, where $1 < j \leq t$;

sending, by the computing device, the authentication token;

receiving, in response to the sent authentication token, the requested access.

9. The at least one computer-readable media of claim 8, the method further comprising receiving, in response to any of the received partial authentication tokens being incorrect, a denial to the requested access.

10. The at least one computer-readable media claim 8 wherein j is a number of partial authentication tokens required for the computing the authentication token.

11. The at least one computer-readable media of claim 8 wherein each correct partial authentication token of the received partial authentication tokens represents a share of a secret key required for the requested access.

12. The at least one computer-readable media of claim 8 wherein the authentication token represents a secret key required for the requested access.

13. The at least one computer-readable media of claim 8 wherein the user is a user of the computing device.

14. The at least one computer-readable media of claim 8 wherein the receiving the requested access is dependent on a session key based on a random number.

15. A system comprising:

a computing device configured for sending a request for access;

the computing device further configured for receiving, in response to the sent request, a list of t authentication devices, a unique service identifier, and a value;

the computing device further configured for sending, for each j where $1 < j \leq t$, data comprising a user identifier of a user, the unique service identifier, the value, and a random number;

the computing device further configured for receiving, in response to the sent data for each j, a partial authentication token based on the sent user identifier, the sent unique service identifier, the sent value, and the sent random number;

the computing device further configured for computing an authentication token based on j of the received partial authentication tokens, where $1 < j \leq t$;

the computing device further configured for sending, by the computing device, the authentication token;

the computing device further configured for receiving, in response to the sent authentication token, the requested access.

16. The system of claim 15, the computing device further configured for receiving, in response to any of the received partial authentication tokens being incorrect, a denial to the requested access.

17. The system claim 15 wherein j is a number of partial authentication tokens required for the computing the authentication token.

18. The system of claim 15 wherein each correct partial authentication token of the received partial authentication tokens represents a share of a secret key required for the requested access.

19. The system of claim 15 wherein the authentication token represents a secret key required for the requested access.

20. The system of claim 15 wherein the receiving the requested access s dependent on a session key based on a random number.

* * * * *